E. H. OVERSMITH.
FRONT AXLE MOUNTING MECHANISM.
APPLICATION FILED FEB. 16, 1917.
1,254,842.
Patented Jan. 29, 1918.
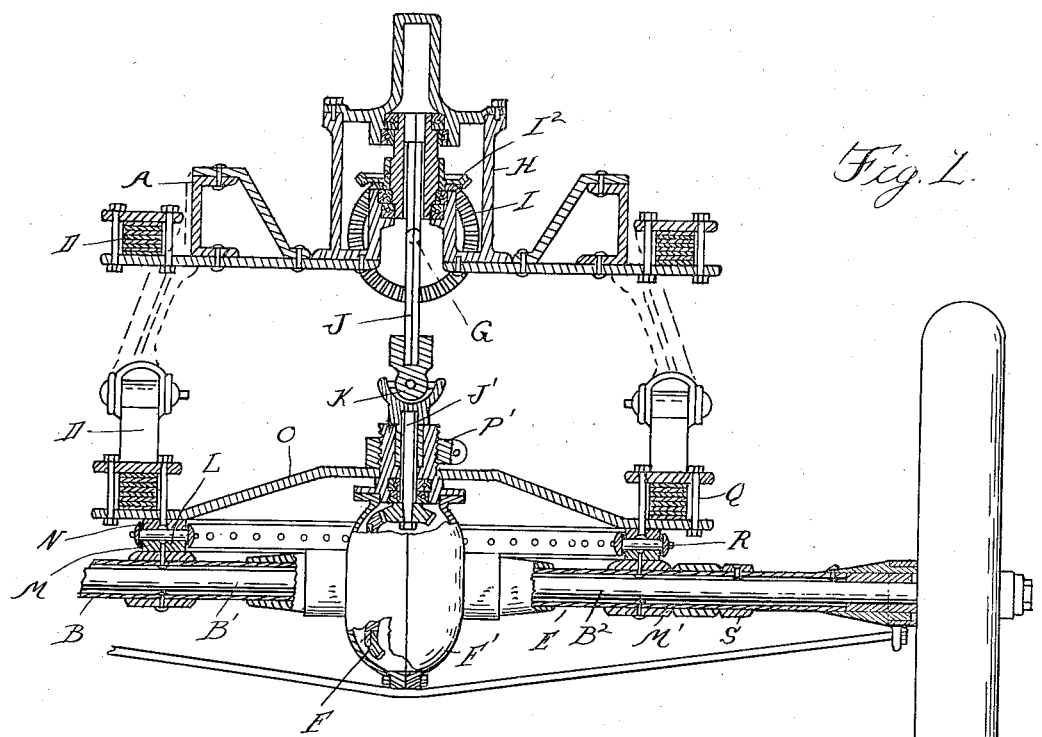
Fig. 1.
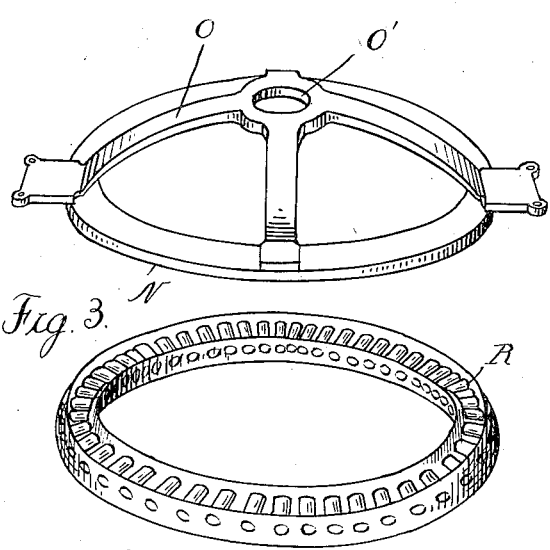
Fig. 3.
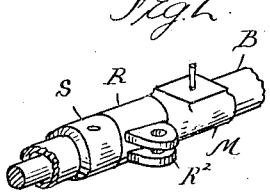
Fig. 2.
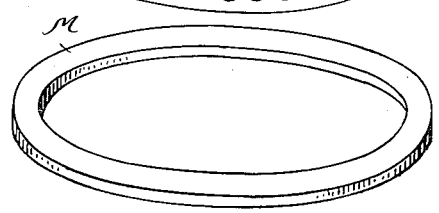
Inventor
Elmer H. Oversmith
By *(signature)*
Attorneys

UNITED STATES PATENT OFFICE.

ELMER H. OVERSMITH, OF JONESVILLE, MICHIGAN, ASSIGNOR, BY MESNE ASSIGNMENTS, TO BRAZIL MOTORS COMPANY, OF BRAZIL, INDIANA, A CORPORATION OF INDIANA.

FRONT-AXLE-MOUNTING MECHANISM.

1,254,842.        Specification of Letters Patent.     Patented Jan. 29, 1918.

Application filed February 16, 1917. Serial No. 149,113.

*To all whom it may concern:*

Be it known that I, ELMER H. OVERSMITH, a citizen of the United States of America, residing at Jonesville, in the county of Hillsdale and State of Michigan, have invented certain new and useful Improvements in Front-Axle-Mounting Mechanism, of which the following is a specification, reference being had therein to the accompanying drawings.

The invention relates to mounting mechanism for the front axle of a motor vehicle and the object of the invention is to obtain a construction in which the front axle is secured to the frame of the vehicle in such a way that the former may be easily and readily turned relative to the latter for steering the vehicle, and that the driving mechanism for the front axle may be unaffected by the turning movement. Another object of the invention is to obtain a construction which is simple and strong; and further to obtain various advantages hereinafter set forth.

In the drawings:

Figure 1 is a sectional view of the construction embodying my invention;

Fig. 2 is a fragmentary perspective view of a detail; and

Fig. 3 is a perspective view of the parts of the fifth wheel when separated.

A represents the frame of the motor vehicle, B the front axle, C the wheels upon the axle and D the springs yieldably supporting the frame upon the axle. The front axle B comprises the shaft members B' and B² in axial alinement with each other and located within the housing E, said shaft members being connected to the wheels C and the differential gearing F inclosed within its housing F', which is securely mounted upon the housing E.

For the purpose of driving the differential gearing F from the substantially horizontal shaft G extending from a suitable source of power (not shown) there is provided the gear box H vertically mounted upon the frame A and inclosing the drive gear I mounted upon the shaft G and the driven gear I² meshing with the drive gear I and extending transversely thereof. Non-rotatably and longitudinally slidably engaging the driven gear I² is the polygonal shaft J extending substantially vertically and connected to the substantially vertically extending driving shaft J' of the differential gearing by means of the universal joint K.

For the purpose of permitting of the steering of the front axle by turning the same there is provided the fifth wheel L comprising the circle bar M secured to the axle housing E by means of the clips M' and the complementary circle bar N upon which is mounted the cross connection or spider O extending diametrically thereof and secured thereto, the spider being provided with a central aperture O' for engaging the upper and cylindrical end of the differential gearing housing F'. For clamping the spider O in position the split nut P threadedly engaging the upper and cylindrical end of the differential gearing housing F' is provided, the bolt P' being also provided for clamping the split nut in engagement with the housing F'. At opposite ends of two of the oppositely extending arms of the spider O the springs D are supported and securely clamped thereto, the bolt Q extending through the clips for the springs, the spider and the complementary circle bar to retain the same in engagement. Preferably interposed between the complementary circle bars M and N is some anti-friction device, shown in the present instance as the roller bearings R.

For the purpose of steering, the front axle is provided with the sleeve R' having the bifurcated lug R², said sleeve being held in longitudinal adjustment between the clips M' and the collar S secured upon the sleeve E. The usual connections (not shown) are provided for extending from the bifurcated lug of the sleeve R to the steering wheel.

From the above description it will be readily seen that the fifth wheel is securely positioned with respect to the front axle and that the springs are positioned with respect to the fifth wheel, the arrangement being such that both the steering and the driving of the axle are permitted, since the fifth wheel is substantially concentric with the driving shaft of the differential gearing.

What I claim as my invention is:

1. In a motor vehicle, a drive axle, means for driving said axle, a frame, springs supporting said frame, complementary circle bars upon said axle, and a cross connection between said circle bars and springs, said cross connection having a substantially central aperture through which said driving means passes.

2. In a motor vehicle, a drive axle, driving means for said axle, a housing surrounding said driving means, provided with a cylindrical portion, a frame, a fifth wheel for supporting said frame upon said axle, comprising a circle bar secured to said axle, a complementary circle bar and a cross connection upon said complementary bar and secured thereto, provided with an aperture for engaging the cylindrical portion of said housing, and a nut engaging said cylindrical portion for retaining said cross connection in place.

3. In a motor vehicle, a drive axle provided with a differential gearing and a housing for said gearing, said housing having a cylindrical portion, a frame, springs supporting said frame, a circle bar upon said axle, a complementary circle bar, a cross connection secured to said complementary circle bar and provided with a substantially central aperture for engaging said cylindrical portion, said springs resting upon opposite ends of said cross connection, a common means for securing said springs, opposite ends of the cross connection and the complementary circle bar to each other, and means for retaining said cross connection in place upon said cylindrical portion of the housing.

4. In a motor vehicle, the combination with a drive axle and means for driving said axle, of a frame, springs supporting said frame, a fifth wheel mounted upon said axle, a cross connection between said fifth wheel and springs, and common means for securing said fifth wheel, cross connection and springs to each other.

5. In a motor vehicle, the combination with a drive axle, means for driving said axle, and a housing upon said axle inclosing said driving means, of a frame, springs supporting said frame, a circle bar upon said axle, a complementary circle bar, a cross connection between said complementary circle bar and springs, means for securing said complementary circle bar, cross connection and springs to each other, and means for securing said cross connection to said housing upon the drive axle, whereby said complementary circle bar is secured to said circle bar upon the drive axle.

6. In a motor vehicle, a frame, a drive axle, a fifth wheel upon said axle, springs upon said fifth wheel supporting said frame, and a substantially vertically extending connection from said frame for said drive axle extending through said fifth wheel and positioning the same substantially concentric therewith.

7. In a motor vehicle, drive shafts, differential gearing therefor, a substantially vertically extending driving connection for said gearing, a housing for said gearing and a fifth wheel comprising complementary circle bars upon said drive shafts positioned substantially concentric with and by said housing.

8. In a motor vehicle, a drive axle, driving means for said axle, a frame, springs supporting said frame, and a fifth wheel upon said axle carrying said springs, said fifth wheel having a cross-connection provided with a substantially central aperture through which said driving means passes.

In testimony whereof I affix my signature.

ELMER H. OVERSMITH.